April 11, 1944.  W. H. JENNINGS  2,346,309
APPARATUS FOR CHARGING EXTRUSION APPARATUS CYLINDERS
Filed Aug. 18, 1942   2 Sheets-Sheet 1
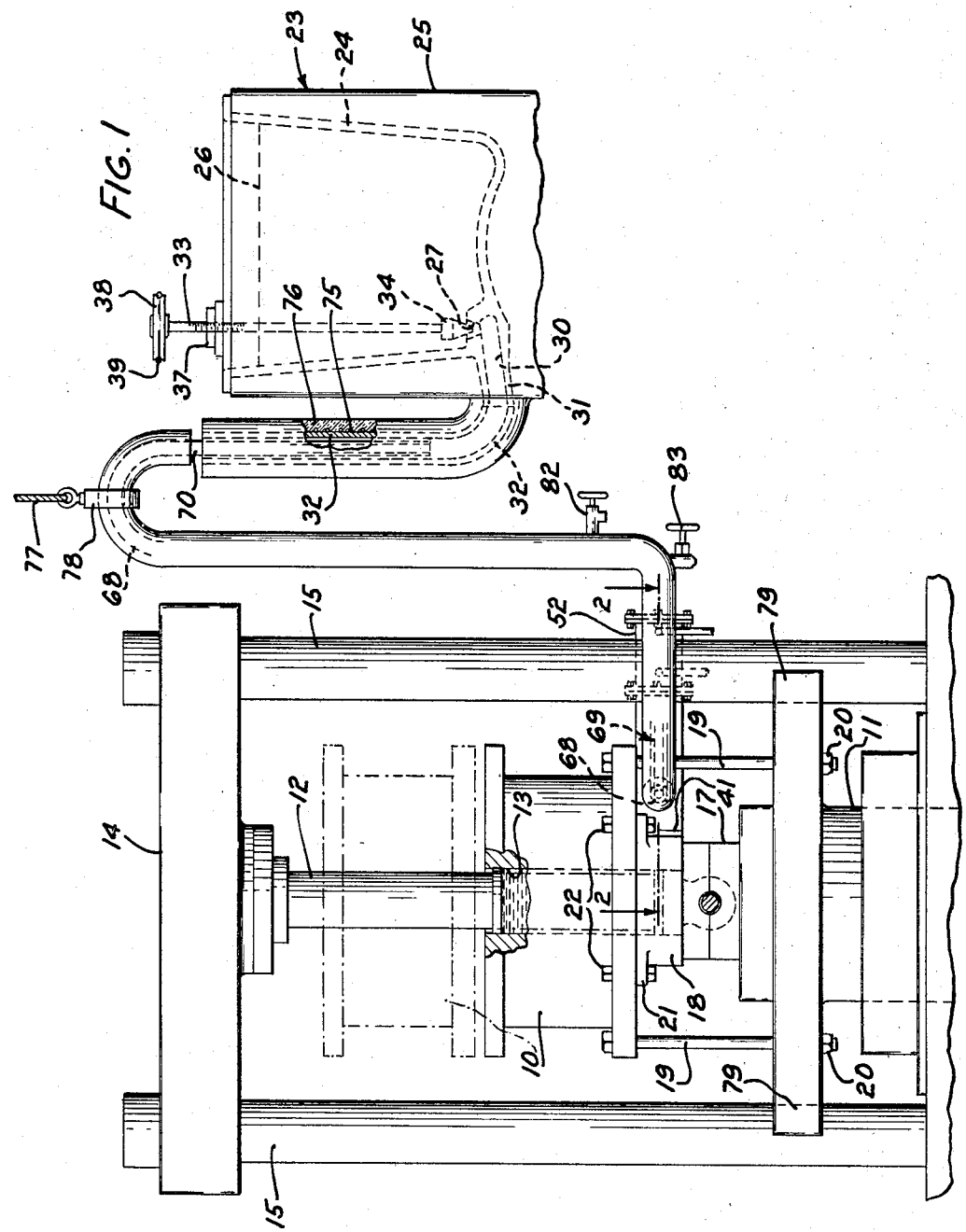
INVENTOR
W. H. JENNINGS
BY Harry L. Duft
ATTORNEY April 11, 1944.  W. H. JENNINGS  2,346,309
APPARATUS FOR CHARGING EXTRUSION APPARATUS CYLINDERS
Filed Aug. 18, 1942  2 Sheets-Sheet 2
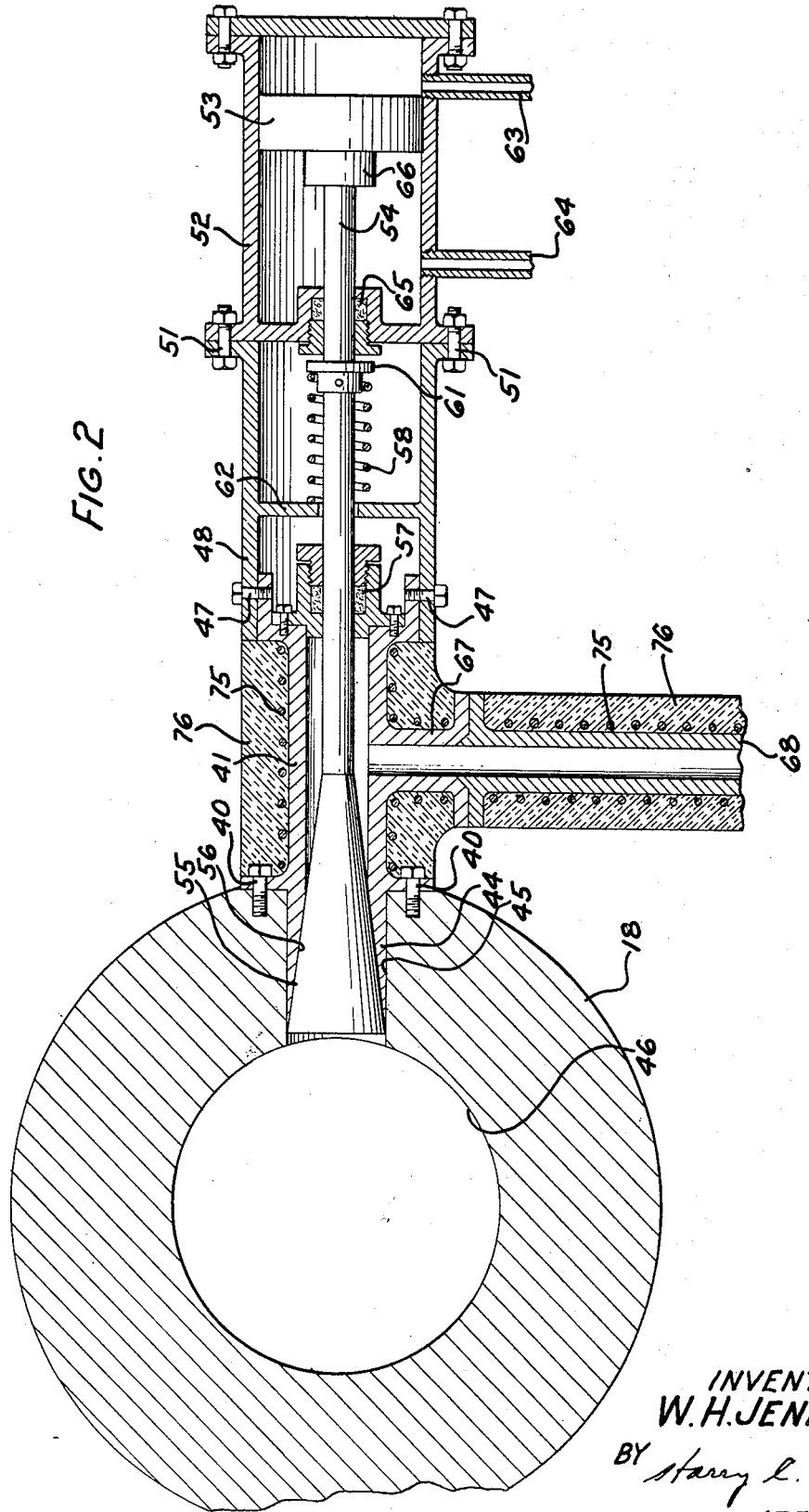
INVENTOR
W. H. JENNINGS
BY Harry L. Duff
ATTORNEY Patented Apr. 11, 1944

2,346,309

UNITED STATES PATENT OFFICE 2,346,309

APPARATUS FOR CHARGING EXTRUSION APPARATUS CYLINDERS

William H. Jennings, Berwyn, Ill., assignor to Western Electric Company, Incorporated, New York, N. Y., a corporation of New York Application August 18, 1942, Serial No. 455,218

5 Claims. (Cl. 207—1)

This invention relates to apparatus for charging extrusion apparatus cylinders with material to be extruded and particularly to an apparatus for charging such a cylinder with material from the bottom.

The present invention is particularly applicable to cable sheath extruding apparatus of the type employing a movable extrusion cylinder into one end of which a stationary plunger is entered in the extrusion operation, the opposite end of the cylinder carrying an extrusion die. The general practice in this type of apparatus, upon completion of the extrusion operation, is to withdraw the cylinder completely from the plunger before refilling the cylinder with molten alloy in preparation for the next extrusion operation. The molten alloy charge is usually introduced into the cylinder through its upper end by means of a movable delivery spout or pipe leading from a melting kettle or reservoir containing a supply of the molten alloy. This practice of charging an extruding apparatus cylinder from its upper end with molten alloy results in considerable splashing and frothing as the molten alloy strikes the usual residual charge at the bottom of the cylinder and this results in a considerable amount of dross, oxides and air bubbles at the top of the charge. Furthermore, it is necessary, when the cylinder is charged from its upper end, to wait until the extrusion cylinder has returned to its extreme lowered position and to completely separate the plunger from the cylinder in order to permit the next charge of molten alloy to be entered into the cylinder.

An object of this invention is to provide practical and efficient apparatus for charging an extrusion cylinder from the bottom to materially reduce oxidation of the alloy, decrease the overall time between extrusion operations, and effectively weld the residual and new charges of molten alloy.

In accordance with one embodiment of the invention, a cable sheath extruding apparatus of the type above referred to is provided with a molten alloy charging unit which is adapted to be removably mounted between the extrusion cylinder and die. The charging unit, which moves with the cylinder and die, includes a syphoning means which is associated with an elevated melting kettle which supplies the molten alloy and a valve which, upon being opened, controls the flow of alloy to the cylinder and, upon closure, prevents extrusion of the molten alloy from the cylinder back to the melting kettle during the extrusion operation.

Other objects and advantages of this invention will more fully appear from the following detailed description, taken in conjunction with the accompanying drawings, in which Fig. 1 is a schematic front elevation, partly in section, of a well-known type of extruding apparatus and alloy melting kettle embodying the apparatus and arrangement of this invention for filling the extrusion cylinder from its lower end, and Fig. 2 is a fragmentary enlarged plan section taken on the line 2—2 of Fig. 1.

Referring to the drawings, the invention is illustrated as embodied in a lead cable sheath extruding apparatus of the type comprising an extrusion cylinder 10 connected to a hydraulically movable ram 11 and a stationary plunger 12, the end of which extends at all times down into an opening 13 of the reciprocatory cylinder. The plunger 12 depends from a fixed head 14, which is supported by suitable columns 15. Interposed between the cylinder 10 and ram 11 and movable therewith is a die block 17 and a cylinder 18, the latter being a part of the filling apparatus of this invention for filling the extrusion cylinder 10 from its lower end, which will be described presently. The die block 17 is of the two-section type and is in direct communication with the opening 13 of the extrusion cylinder 10, through the filling apparatus cylinder 18. The two sections of the die block 17 are held firmly together in the usual manner and the die block and the cylinder 18, as a whole, are held in position with respect to the extrusion cylinder 10 and ram 11 by means of bolts 19 and nuts 20. The cylinder 18 is secured to the extrusion cylinder 10 by lugs 21 and bolts 22 to facilitate the replacement of the die block 17 and the incorporation of the filling apparatus in present types of extruding apparatus to which it is applicable. For a more detailed description of an extruding apparatus and die block of the types above described, to which the filling apparatus of this invention is particularly applicable, reference may be had to Patent Number 1,654,526 to A. B. Brown of January 3, 1928.

At the right of the extruding apparatus and suitably elevated with respect thereto is a melting kettle 23, shown fragmentarily, which comprises a melting pot 24 surrounded by a cylindrical wall 25 of a suitable heat insulating material. The pot 24 holds a supply of molten alloy, such as lead and calcium, the normal level of which is indicated at 26. The pot 24 is replenished by depositing therein, through its upper end, a charge of alloy in suitable form. A hood (not shown) is usually mounted on the upper end of the kettle 23 to prevent splashing during the charging of the kettle and to reduce oxidation of the molten alloy. For maintaining the molten alloy in the pot 24 at a predetermined temperature, a plurality of gas burners (not shown) are employed which are arranged below the pot. Formed at one side in the bottom wall of the pot 24 is a tapered valve seat 27, which communicates with a passage 30 in an integral lateral extension 31 of the pot. The extension 31 projects through the wall 25 of the kettle 23 and is suitably connected to a vertical pipe 32, which rises to substantially the plane of the upper end of the kettle. A rotatable valve rod 33, carrying a valve 34 for seating in the valve seat 27, is screw-threadedly engaged in a bearing 37 secured upon the upper end of the kettle 23. At its upper end, the valve rod 33 is equipped with a pulley 38 in a peripheral groove of which is a belt or rope 39, which may extend over guide wheels (not shown) to a point convenient to an operator whereby the screw-threaded valve rod 33 may be rotated in one direction or the other to seat or unseat the valve 34 to close or open the passage 30 from the pot 24, thus preventing or permitting the movement of the molten alloy from the pot into the vertical pipe 32. While the extruding apparatus is normally operating, the valve 34 is held open to permit the molten alloy to move into the pipe 32.

Referring particularly to Fig. 2, wherein the cylinder 18, previously referred to, is shown fragmentarily in enlarged plan section, the cylinder at its right side has secured thereto, as indicated at 40, a cylindrical valve casing 41 having its left end 44 fitted in a radial opening 45 in the cylinder 18. In the operation of filling the extruding apparatus cylinder 10 with molten alloy from the melting kettle 23, the alloy flows from the kettle and through the valve casing 41 by means of a connection, to be described shortly. The opening 45 communicates with a central opening 46 in the cylinder 18, which is aligned with the opening 13 of the extrusion cylinder 10. Attached to the right end of the casing 41, as indicated at 47, is a cylindrical extension 48, to which, in turn, is secured at 51 a hydraulic cylinder 52. A piston 53 of the cylinder is attached to a piston and valve rod 54, which, at its left end, is tapered to form a valve 55, which is seatable in a tapered valve seat 56 provided in the end 44 of the valve casing 41. The valve 55, in its seated position, as shown, closes communication between the central opening 46 of the cylinder 18 and the interior of the valve casing 41, and thus prevents extrusion of the alloy from the extrusion cylinder 10 into the valve casing during the extrusion stroke of the extrusion cylinder. At the right end of the valve casing 41, a packing gland 57 of a suitable type is provided, in which the valve rod 54 reciprocates, for preventing leakage along the valve rod into the casing extension 48. Surrounding the valve rod 54 in the extension 48 is a compression spring 58, having its opposite ends bearing against a collar 61 fixed to the valve rod and a disc-like member 62 attached to the casing extension, the spring normally acting to slide the valve rod 54 to the right to seat the valve 55 in its seat 56, as shown.

To actuate the valve rod 54 to open the valve 55, hydraulic pressure is directed into the cylinder 52 and against the right hand end of the piston 53 from a source (not shown), through a pipe 63 connected to a cylinder opening. To close the valve 55, assisted by the spring 58, the hydraulic pressure is directed against the left hand end of the piston 53 through a pipe 64 connected to a cylinder opening, the pipes 63 and 64 alternately serving as inlet and outlet pipes for the hydraulic pressure into and out of the cylinder 52. A packing gland 65 surrounds the valve rod 54 to prevent leakage from the left end of the cylinder 52. An extension 66 on the piston 53 engages the gland 65 to limit the movement of the rod 54 and thereby the valve 55 in the opening of the latter.

The valve casing 41 has a hollow lateral extension 67, to which is attached one end of a pipe 68, having a horizontally extending angular formation 69 at its lower end, which extends upwardly and thence downwardly in a U-shaped formation. A downwardly extending arm 70 of the U-shaped upper end of the pipe 68 is adapted to freely move in the bore of the vertical pipe 32, which is connected to and communicates with the interior of the melting pot 24.

Since, in the operation of bottom filling the extrusion cylinder 10 with molten alloy from the melting pot 24, the molten alloy moves through the vertical pipe 32 attached to the stationary pot and thence through the pipe 68 and valve casing 41, which are movable with and into the cylinder, it is desirable to maintain the alloy molten and at a desired temperature. In the embodiment of the invention illustrated, this may be effected by surrounding the pipes 32 and 68 and valve casing 41 with electrical heating units, indicated at 75, the units being connected to a suitable source of electrical energy (not shown). The heating units 75 are embedded in a heat insulating material 76. As is usual in extruding apparatus, the cylinder 10 is formed with a plurality of channels (not shown) for the passage of heating or cooling matter around the wall of the cylinder, as may be desired in the operation of the apparatus.

The weight of the removable and interchangeable bottom filling apparatus attached to and movable with the extrusion cylinder 10 may be counter-balanced by a suitable weight (not shown) fixed to a rope or chain 77 which is secured to the upper end of the U-shaped formation of the pipe 68, as indicated at 78, the chain being guided by pulleys (not shown). To prevent rotation of the ram 11, which carries the filling apparatus and in which the arm 70 of the pipe 68 reciprocates in the stationary vertical pipe 32 of the melting kettle 23, the ram is formed with guide lugs 79, which ride on the columns 15.

For the purpose of initially filling the pipe 68 and valve casing 41 with molten alloy from the melting pot 24 when the extruding apparatus is to be set in operation, a suitable cock 82 is connected to the pipe 68. This permits an air suction line (not shown) to be connected to the pipe 68 for drawing the alloy through the U-shaped formation of the pipe 68 and below the alloy level 26 in the pot and thereafter the alloy will flow due to the syphoning action set up and fill up the pipe 68 and the valve casing 41 and if the valve 55 is open, the alloy will flow into the cylinders 18 and 10 and rise up to the bottom face of the plunger 12. A second cock 83 is connected to the pipe 68 at its lowest point to permit the pipe 68 and valve casing 41 to be drained if necessary. Any alloy that solidifies in the cocks 82 and 83 may be melted by heating the same with a blow torch, or other means may be employed.

The operation of the apparatus described hereinbefore for filling the extrusion cylinder 10 from its lower end is as follows:

It will be assumed that the elevated alloy melting pot 24 has a supply of molten alloy therein and its level is being maintained substantially at the point 26 and the valve 34 is open, thus providing a suitable head of alloy at all times in the pot and the pipe 68 and valve casing 41 so that it will flow into the cylinders 18 and 10 when the valve 55 is opened. As shown in Fig. 1, the extrusion cylinder 10 has just been filled with the molten alloy and the valve 55 is closed. After a suitable period of time to allow the charge to solidify and bond it to the usual residual alloy slug remaining in the cylinder 18 below the valve opening 45 from the previous extrusion operation, the apparatus is ready for an extrusion operation. This is effected by causing an upward movement of the ram 11 in the usual manner, which causes the charge of alloy to be extruded through the die block 17 down to a point just below the valve opening 45. Immediately thereafter, and at a point in the initial downward movement of the ram 11 that the end of the plunger 12 is above the valve opening 45, the valve 55 is opened. The valve 55 is opened by directing hydraulic pressure into the cylinder 52 through the pipe 63 and against the right side of the piston 53, thus moving the piston towards the left (Fig. 2) and unseating the valve from its seat 56, whereupon another charge of molten alloy is caused to flow from the head of alloy in the melting pot 23 through the pipe 68 into the valve casing 41 and thence into the cylinders 18 and 10 and up to the bottom face of the plunger 12. This, it will be apparent, takes place during the return stroke of the extrusion cylinder 10 and while the lower end of the plunger 12 is within the cylinder. The valve 55 is now closed by cutting off the hydraulic pressure into the cylinder 52 through the pipe 63 and directing it through the pipe 64 into the cylinder and against the left side of the piston 53, which thereupon moves to the right and closes the valve. The extruding and filling apparatus is now in condition to repeat the operation just described.

Although in the embodiment of the invention described herein and illustrated in the drawings, the extrusion cylinder 10 is filled through its lower end through the attached cylinder 18, which forms an extension thereof, it will be readily apparent that the cylinder 10 may be so formed and provided with a radial opening, similar to the opening 45 in the cylinder 18, at its lower end such as will permit it to be filled from the melting pot 24 in the manner described.

It will be obvious that by employing the features of this invention in the above-described type of extruding apparatus, the oxidizing action of air on the molten alloy is greatly reduced by maintaining the upper end of the cylinder closed at all times and the elimination of all splashing during the filling operation. Furthermore, due to the filling of the cylinder through its lower end during its return stroke after an extrusion operation, the overall time between extrusion operations is materially reduced and the bonding of the residual slug of the previous charge to the new charge is more effectively made. Also, it will be apparent that the particularly described and illustrated arrangement wherein the cylinder 18 is removably attached to the bottom of the extrusion cylinder 10 permits the bottom filling features of this invention to be readily incorporated in extruding apparatus of the type described.

While the features of this invention have been described in connection with a specific structure and arrangement for filling extruding apparatus cylinders through their lower ends with molten lead-calcium alloys, it should be understood that modifications can be made and it is capable of other applications.

What is claimed is:

1. An extrusion apparatus comprising a movable extrusion cylinder, a supply container for material to be extruded, and a syphon movable with said cylinder for transferring material from said container to said cylinder.

2. An extrusion apparatus comprising a stationary supply container for material to be extruded, a movable extrusion cylinder, a syphon movable with said cylinder for transferring material from said container to said cylinder, and a variable length connection between said syphon and container.

3. An extrusion apparatus comprising a movable extrusion cylinder having an inlet opening in its side adjacent its extrusion end, a stationary supply container for material to be extruded, a syphon movable with said cylinder for transferring material from said container through said inlet opening into said cylinder during a return movement of said cylinder after an extrusion movement, and a variable length connection between said syphon and container.

4. In an extruding apparatus comprising a vertically movable extrusion cylinder and die communicating therewith at its lower end, a cooperating stationary plunger entered in and closing the cylinder at its upper end throughout its extrusion and return movements, said cylinder having an inlet opening in its side above the die, a stationary supply container for material to be extruded, a syphon communicating with said inlet opening and movable with said cylinder for transferring material from said container to said cylinder, and a variable length connection between said syphon and container.

5. In an extruding apparatus comprising a vertically movable extrusion cylinder and die communicating therewith at its lower end, a cooperating stationary plunger entered in and closing the cylinder at its upper end throughout its extrusion and return movements, an auxiliary cylinder movable with and arranged between and communicating with the extrusion cylinder and die, said auxiliary cylinder having an inlet opening in its side, means for supplying and causing material to be extruded to flow through said inlet opening to fill the extrusion cylinder during its return movement, said means including a stationary supply container for material to be extruded disposed above the plane of said inlet opening, a connection from said container to said inlet opening movable with said auxiliary cylinder, and means for closing said inlet opening during the extrusion movement.

WILLIAM H. JENNINGS.